(12) United States Patent
Martin

(10) Patent No.: US 6,704,329 B2
(45) Date of Patent: Mar. 9, 2004

(54) MINIMIZING THE EFFECT OF JITTER UPON THE QUALITY OF SERVICE OPERATION OF NETWORKED GATEWAY DEVICES

(75) Inventor: G. J. Martin, Carlsbad, CA (US)

(73) Assignee: Path 1 Network Technologies Inc., San Diego, CA (US)

(*) Notice: Subject to any disclaimer, the term of this patent is extended or adjusted under 35 U.S.C. 154(b) by 0 days.

(21) Appl. No.: 10/141,630

(22) Filed: May 7, 2002

(65) Prior Publication Data
US 2002/0186681 A1 Dec. 12, 2002

Related U.S. Application Data
(60) Provisional application No. 60/289,678, filed on May 8, 2001.

(51) Int. Cl.[7] .................................................. H04J 3/06
(52) U.S. Cl. ........................ 370/516; 370/252; 375/371
(58) Field of Search ............................. 370/105.3, 252, 370/503, 516, 521, 395.62; 375/118, 371, 372, 376, 326, 355, 373, 293; 328/155; 360/51; 327/12, 156, 175; 455/179.1

(56) References Cited

U.S. PATENT DOCUMENTS

| 4,862,485 A | * | 8/1989 | Guinea et al. ............... 375/120 |
| 4,942,593 A | | 7/1990 | Whiteside et al. ........... 375/118 |
| 5,402,425 A | | 3/1995 | Bladh ....................... 370/105.3 |
| 5,471,510 A | | 11/1995 | Renault et al. ............. 375/372 |
| 5,541,965 A | * | 7/1996 | Daffara ....................... 375/326 |
| 5,668,841 A | | 9/1997 | Haskell et al. ............... 375/371 |
| 5,896,427 A | | 4/1999 | Muntz et al. ................ 375/372 |
| 5,898,744 A | | 4/1999 | Kimbrow et al. ............ 375/376 |
| 6,061,410 A | | 5/2000 | Linz ........................... 375/371 |

OTHER PUBLICATIONS

Written Opinion; PCT/US02/14847; Aug. 14, 2003.

* cited by examiner

Primary Examiner—John Pezzlo
(74) Attorney, Agent, or Firm—Fish & Richardson P.C.

(57) ABSTRACT

The effect of network jitter upon the quality of service operation of networked gateway devices is minimized with the use of minimum delay filtering prior to the control/synchronization processing by the "off-ramp" networked gateway device.

23 Claims, 7 Drawing Sheets

MINIMIZING THE EFFECT OF JITTER UPON THE QUALITY OF SERVICE OPERATION OF NETWORKED GATEWAY DEVICES

CROSS-REFERENCE TO RELATED APPLICATIONS

This application claims benefit of U.S. Provisional application No. 60/289,678, filed May 8, 2001, the content of which is herein incorporated by reference in its entirety.

TECHNICAL FIELD

This invention relates to transmitting data over a network, and more particularly to eliminating network jitter of the transmitted data.

BACKGROUND

There are many applications where it is required to send digital data over a packetized network (e.g. the Internet) with a certain guaranteed Quality of Service (QoS). These QoS applications are composed of, but not limited to, Voice Over the Internet Protocol (VoIP), Video Conferencing, Video Monitoring/Control (eg. remote manipulation), Video Surveillance, Tele-Medicine, and Streaming/Broadcast Video. In these applications, it is critical that the packetized digital data be sent with certain network-related quality guarantees with regards to parameters such as: bandwidth allocation; latency; jitter; sequencing (i.e. ordering); and data loss.

To the extent that these network-related quality parameters cannot be controlled by the operation/utilization of the network, either the success of the application is rendered useless or an additional burden is placed on the transmitting and receiving networked gateways.

In particular, random queuing delays at nodes in a packetized network add jitter to transported data. For the case of streaming video applications, network jitter cannot always be controlled to an acceptable level. Hence, to mitigate the effects of jitter, the network interface device on the receiving side of a network link (or receiving gateway) typically utilizes some form of buffering of the received data before sending it out at the desired rate to the receiving media player.

The buffering, though adding additional latency to the received signal, provides the possibility of "smoothing out" the random rate of receipt of data packets over the network (due to jitter). The video stream data can then be sent out to the receiving media player at a fairly constant rate.

Use of this buffering mechanism introduces an additional problem. How does the receiving network gateway know at what rate to play back the streaming video data? That is, the goal of the receiving network gateway is to output the video data at exactly the same rate that the transmitting network gateway received the video data. Typically, the allowable tolerance between the receiving video rate and the play-out video rate is quite small (on the order of nanoseconds for MPEG2 video streams). Any difference in these two rates will cause the buffer to either overflow or underflow and stall the video output. Furthermore, dynamic adjustments in the play-out video rate may re-introduce unacceptable levels of jitter into the play-out video stream. For broadcast applications, broadcasters generally abide by the European Telecommunications Standards Institute (ETSI) ETR-290 Standard that specifies that such jitter must be kept below 500 ns. Thus, an accurate estimate of the video rate is essential for both filtering out jitter.

Producing an accurate video play-out rate also helps minimize the size of the jitter buffer to only that needed to mask network jitter. Minimizing the buffer size, in turn, minimizes the resulting added latency—a critical parameter in applications involving feedback such as Video Conferencing and Remote Manipulation.

In essence, the transmitting and receiving network gateway's goal is to render the intermediate network as being completely transparent to the application.

The matching of the input/output video rates to such tight tolerances generally requires the synchronization of the network gateways. This can be done in a number of ways. Among them are: time synchronization and FIFO metering.

Time Synchronization:

One way is to have both the transmitting and receiving gateway devices operate with exactly the same clock. This requires sending a synchronization (i.e. time sync) signal from the transmitting gateway device to the receiving gateway device. The receiving gateway device can then use the time sync signal to adjust its local oscillator to match that of the transmitting gateway device.

A problem arises with this approach in that the time sync signal is generally sent over the same network, and experiences the same network jitter, that the steaming video is sent. The time sync signal can thus be delayed by random (unknown) amounts (as much as 500 msec in some cases). This delay can cause serious problems with attempting to synchronize networked gateway devices. An approach (minimum delay filtering) is presented later in this report that has been found to effectively eliminate the influence of network jitter when using time synchronization.

FIFO Metering:

Another, yet novel way of synchronizing networked gateway devices is to encode in the data packets sent to the receiving network gateway the video play-out rate at the transmitting network gateway device. This is typically done by periodically embedding in the video stream a time stamp prior to packetization and transmission over the network.

Assuming a constant bit-rate for the video stream, the receiving network gateway device can then read the timestamps and, by counting the number of packets received between timestamps, can calculate the rate (in Mbps) at which the transmitting gateway sent the video stream. The receiving network gateway can therefore play out the video data at the calculated rate.

This method works fairly well. However, the calculated rates are not exact and can be in error due to lack of knowledge of the true frequencies of the up-stream timestamper and the receiving gateway's local oscillator. In particular, the play-out rate based on a remote oscillator must translate into a rate using a local oscillator that may not be at exactly the same frequency as the up-stream oscillator. The errors can be large enough such that the required tolerance on video playback rate is exceeded. Another issue is that even if the exact rates could be known, they are subject to a slowly varying drift, mainly due to temperature changes of the oscillators. Hence, some form of error correction is still needed.

A way to correct for this error is to periodically measure the buffer (i.e. FIFO) depth of the receiving gateway device. By this means, a residual accumulation rate of data in the buffer can be determined. The output rate can then be adjusted such that the accumulation rate is driven to zero and thus effectively accomplish synchronization of the networked gateway devices. This method is commonly known as FIFO metering.

However, as in the previous approach, the network jitter introduces a random variability in the buffer depth measurements. Unless properly dealt with, this random error can seriously affect how well the networked gateway's can be synchronized. In all cases, a jitter filtering mechanism must be employed in order to properly calculate, synchronize, and track the true video play-out rate.

SUMMARY

The effect of network jitter upon the quality of service operation of networked gateway devices is minimized with the use of minimum delay filtering prior to the control/synchronization processing by the "off-ramp" networked gateway device.

DESCRIPTION OF DRAWINGS

These and other features and advantages of the invention will become more apparent upon reading the following detailed description and upon reference to the accompanying drawings.

DETAILED DESCRIPTION

Figure 1:
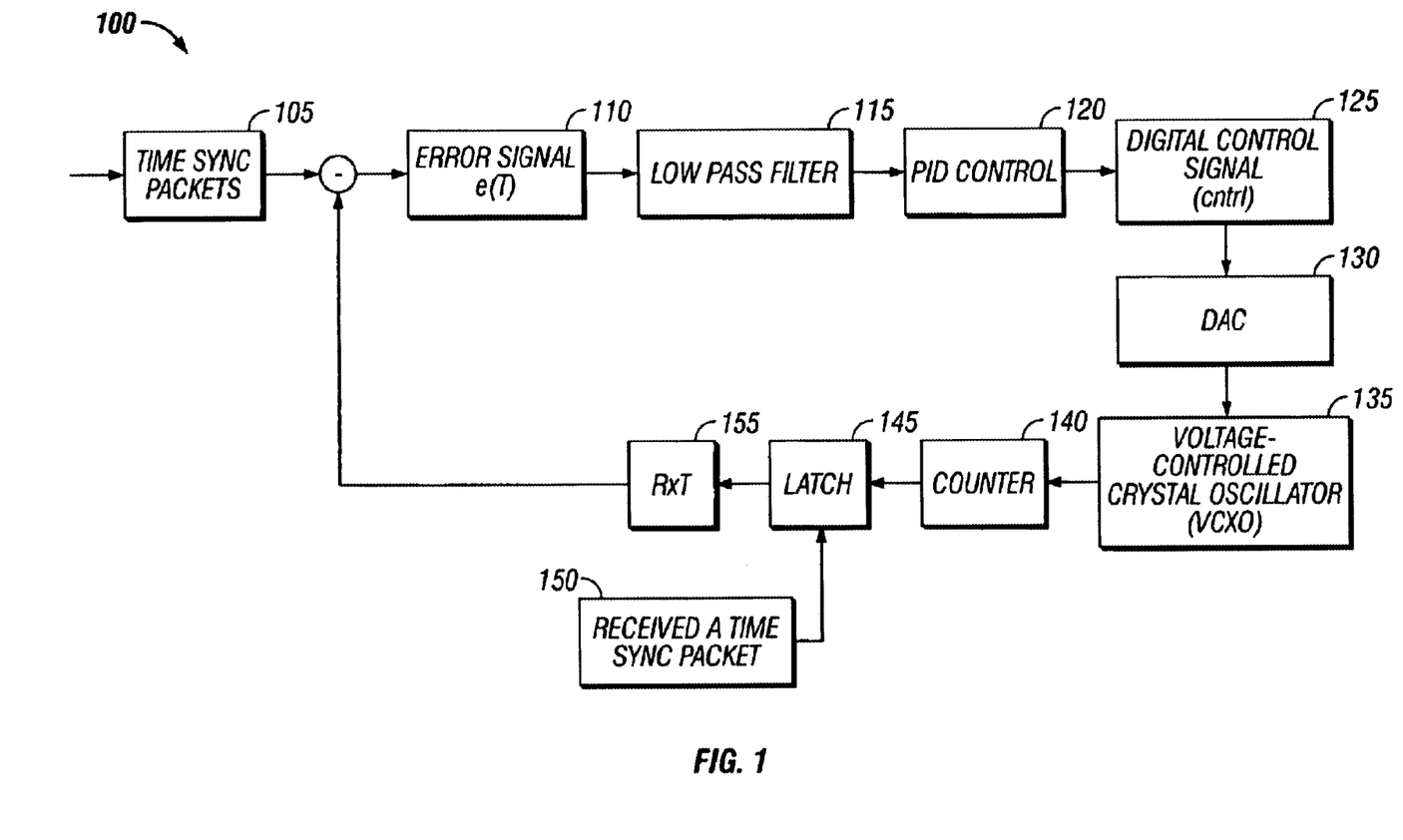
FIG. 1 illustrates a Time Synchronization technique for synchronizing the receiving networked gateway with the transmitting networked gateway.
Figure 2:
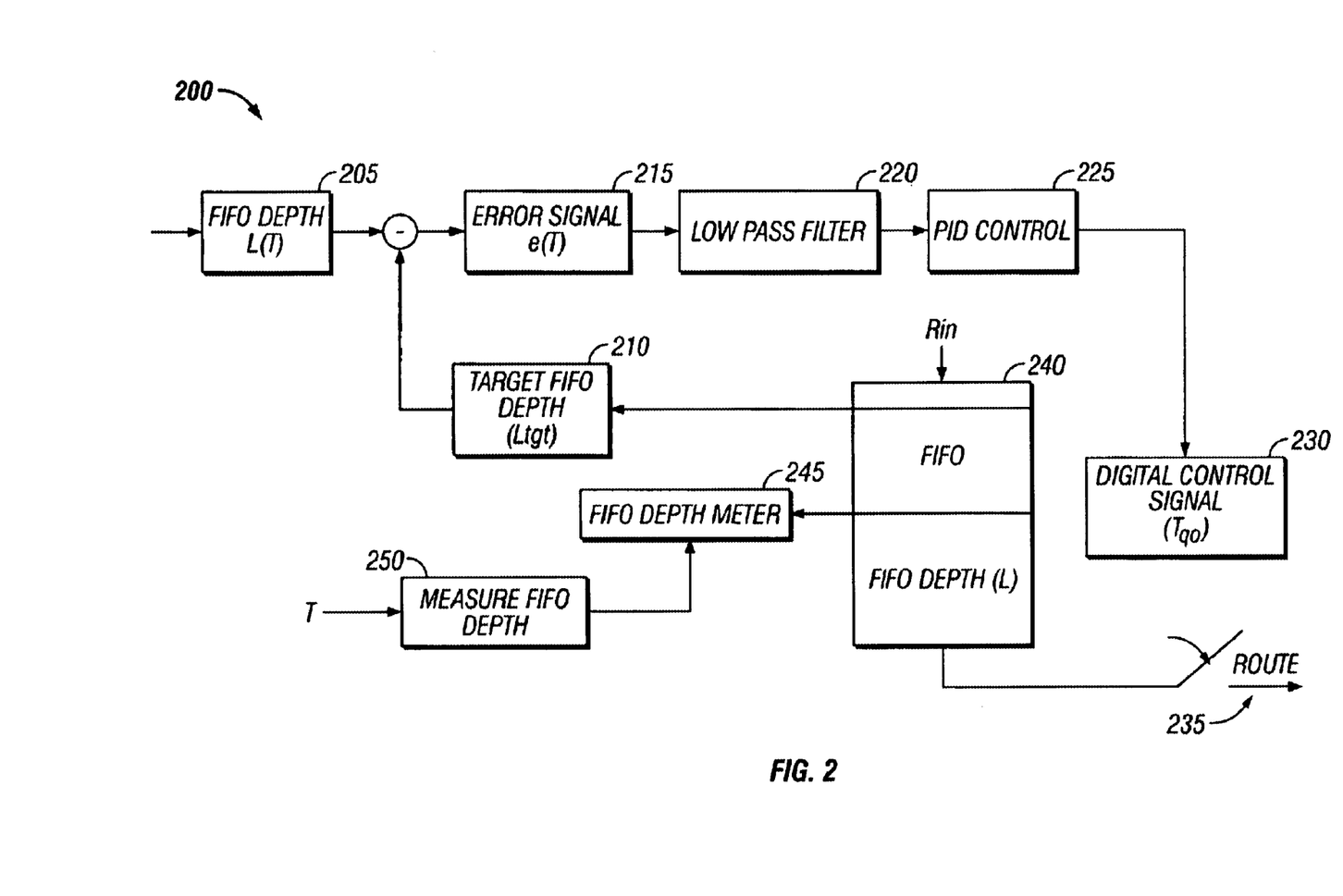
FIG. 2 illustrates a FIFO Metering technique for synchronizing the receiving networked gateway with the transmitting networked gateway.

The method of synchronizing the receiving networked gateway with the transmitting networked gateway is shown in FIG. 1 for Time Synchronization, and in FIG. 2 for FIFO Metering.

In a preferred implementation of this invention, these two approaches to synchronization involve the use of a low-pass filter prior to the control step. As discussed below, these approaches can be improved significantly by the use of a minimum delay filter prior to the low pass filter. However, in an alternate implementation of this invention, it is even possible that the minimum delay filter can be used by itself, thereby eliminating the low-pass filter completely.
Time Synchronization:

In the Time Synchronization method 100 of FIG. 1, time sync packets 105 (received from the transmitter gateway) are differenced from the (latched) receiver gateway's local time. This results in an error signal e(T) 105 which is then passed through a digital low-pass filter 115 in an attempt to remove the effects of network jitter from the time-differenced signal. The low pass filter 115 may be an IIR, FIR or moving average type of filter. In the presence of small amounts of network jitter, the low pass filtering approach works fine. When the jitter is large, then this type of digital filtering can experience problems in being very effective.

After the low-pass filtering step, in one implementation of this invention, the digital error signal is fed into a Proportional-Integral-Derivative (PID) type of controller 120. The PID Controller generates a digital control signal (cntrl) 125 that is fed to a Digital-to-Analog Controller (DAC) 130. The PID type of control algorithm is well known in the field of control systems and is the most commonly deployed algorithm in process control. The PID algorithm outputs a weighted sum of three output control signals in response to an error input signal: an output proportional to the input, an output proportional to the time integral of the control signal, and an output proportional to the time derivative of the control signal. Outside of the improvement of a minimum delay filter as taught by this invention, standard control theory, such that taught in "The PID Control Algorithm—How it works and how to tune it," by John A. Shaw, Process Control Solutions, Nov. 7, 2001, Published electronically by John A. Shaw, Rochester N.Y., http://www.jashaw.com, the contents of which are hereby incorporated by reference herein, can be used to design the synchronization control loop, and in particular, PID block 120.

The DAC 130 drives a Voltage-Controlled Crystal Oscillator (VCXO) 135. The VCXO 135 drives a counter 140 that should ideally be counting at exactly the same rate as (and in-phase with) the transmitting networked gateway's clock. The counter 140 feeds a latch 145, which receives and an input a received time sync packet 150. The latch 145 outputs a signal Rxt 155, which is used to generate the error signal 110.

The control loop will only work as well as the low-pass filter 115 removes the effect of network jitter from the error signal e(T) 110. Significant amounts of network jitter results in the transmitted timestamp being received later than it would otherwise. That is, the receiver's time stamp is in error (i.e. longer time than expected) due to the network randomly delaying the receipt of the transmitter gateway's timestamp.

To the extent that the receiver gateway cannot remove network jitter, the video stream will be transmitted out of the receiver gateway at an incorrect rate.
FIFO Metering:

In the FIFO metering method 200 of FIG. 2, a FIFO depth meter measures the FIFO depth, L(T) 205, on a periodic interval every T sec. The measured FIFO depth 205 is differenced from the target FIFO depth, Ltgt 210. (The target FIFO depth 210 is determined from the expected Rin and network jitter.) This results in an error signal e(T) 215 which is then sent through a digital low-pass filter 220 in an attempt to remove the effects of network jitter from the error signal 215. The low pass filter 220 may be an IIR, FIR or moving average type of filter. In the presence of small amounts of network jitter, the low pass filtering approach works fine. When the jitter is large, then this type of digital filtering can experience problems in being very effective.

After the low-pass filtering step, the digital error signal is fed into a Proportional-Integral-Derivative (PID) type of controller 225. The PID Controller generates a digital control signal (Tqo) 230 which controls the output data rate from the FIFO, Rout 235. This PID controller uses the same type of PID algorithm as the time synchronization technique of FIG. 1 and uses the same body of control theory for its design.

The control loop will only work as well as the low-pass filter removes the effect of network jitter from the error signal e(T) 215. Significant amounts of network jitter results in the transmitted data packets being received later into the FIFO 240 than it would otherwise. That is, the receiver's FIFO Depth measurement L(T). 205, is in error (i.e. data packets received later in time than expected) due to the network randomly delaying the receipt of the transmitter gateway's data packets. The measure FIFO depth 250 is fed into a FIFO depth meter 245.

Figure 3:
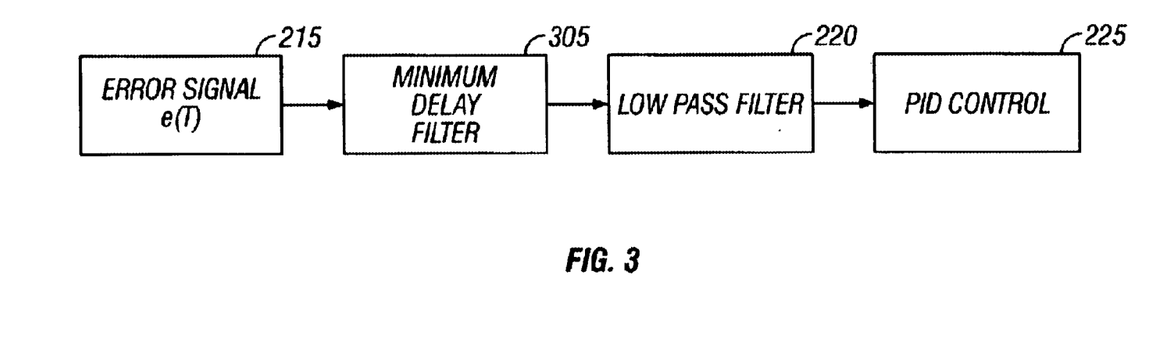
FIG. 3 illustrates one possible use of a minimum delay pre-filter for synchronizing the receiving networked gateway with the transmitting networked gateway.

To the extent that the receiver gateway cannot remove network jitter, the video stream will be transmitted out of the receiver gateway at an incorrect rate, due to Tqo 230 being in error. The present invention involves the use of a non-linear pre-filter prior to the low-pass filters shown in FIGS. 1 and 2. The use of the non-linear filter is illustrated in FIG. 3.

The pre-filter is called a minimum delay filter 305, because it is based on the principle that network jitter can only delay the receipt of a signal. That is, the signal will never be received any sooner than it would in the absence of network jitter.

In other words, when trending the received signal, those observations with the lesser delay are more likely correct in value than those observations with increased delay.

The problem then becomes how to tell which observations have more (or less) delay than the other observations. The answer is to trend the observations among themselves, which may be done using a median-type of filter.

Median filters work by passing a moving window over the data. For each observation, the windowed data are sorted and the current observation is replaced with the median of the sorted data. The basic assumption is that impulse noise will deviate substantially in value from the average signal level and hence can be easily removed from the original data.

For the case of removing the effects of network jitter from the signals described previously, a maximum (or minimum) type of filter is more appropriate. The choice of maximum or minimum depends on how the error signal, illustrated in FIGS. 1 and 2, are defined.

As in the case of a median filter, for minimum delay filtering a window is moved over the data of interest. For each observation, the maximum (or minimum) of all the data in the window is determined. The current observation's value is replaced with the maximum (or minimum). This process is repeated continuously as time progresses.

As previously mentioned, although standard control systems and one preferred embodiment of the present invention would typically use a low-pass filter within the control loop, as shown in FIGS. 1 and 2, one possible alternative implementation of the present invention would use the minimum delay filter in place of the low-pass filter.

Figure 4:
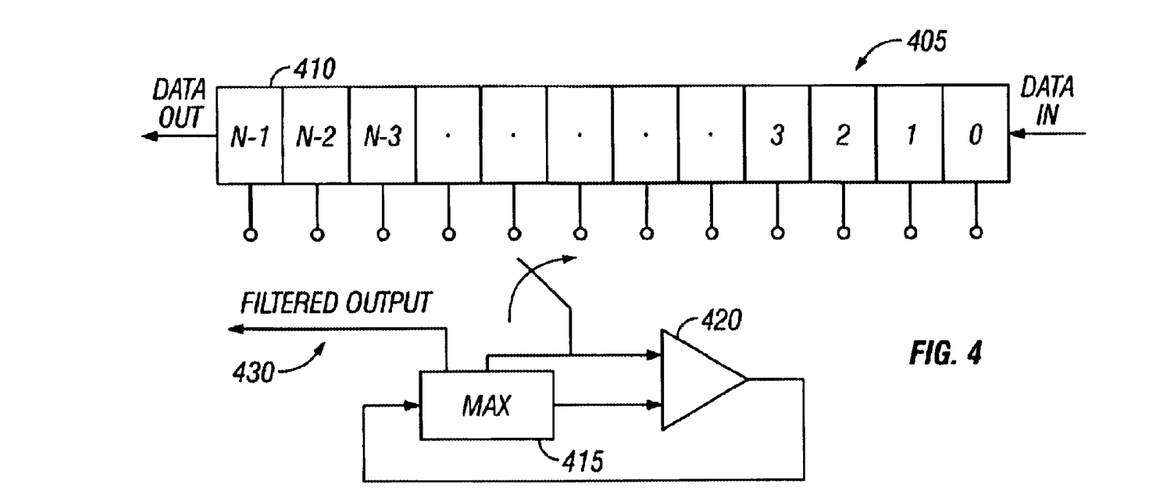
FIG. 4 illustrates the implementation of the minimum delay pre-filter.

Implementation:

FIG. 4 illustrates the operation of the minimum delay filter 305. Data is fed through a multi-tapped delay register 405, wherein the last N samples are held in memory. For each new sample read in, the following operations are performed:

Load in the N−1st sample 410 into the Max register 415;

Successively sequence through the remaining N−1 samples, comparing with a comparator 420 each value with the value stored in the Max register 415;

If the current sample is greater than the value stored in the Max register 415, replace Max with the current value.

Upon completion of all the comparisons, the filtered result 430 is output from the Max register 415.

Figure 5A:
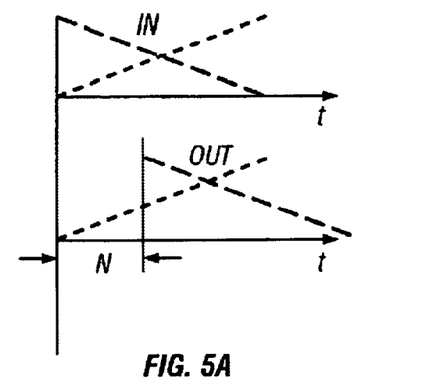
FIG. 5A illustrates that trends in the input data, greater than the filter width N, are preserved after minimum delay filtering.
Figure 5B:
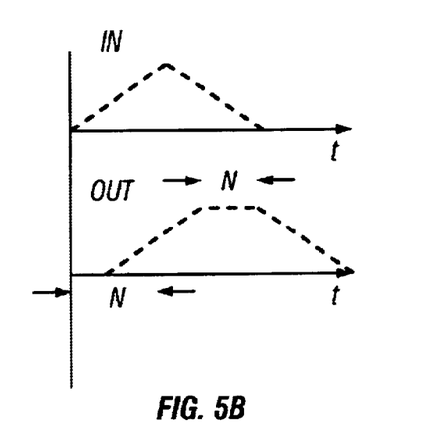
FIG. 5B illustrates that large order trends in the data are preserved after filtering.
Figure 5C:
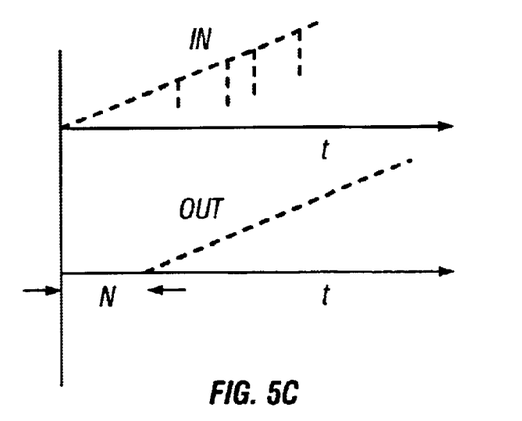
FIG. 5C illustrates that jitter-like deviations from the large order trend are completely eliminated by minimum delay filtering.

Properties:

Some of the properties of minimum delay filtering are illustrated in FIGS. 5A–5C. FIG. 5A shows that trends in the input data, greater than the filter width N, are preserved after minimum delay filtering. In the case of the maximum implementation, descending trends are delayed by the width of the filter. Ascending trends are not. This delay must be taken into account in the design of the PID Controller such that adequate phase margin is maintained to preserve stability.

FIG. 5B again shows that large order trends in the data are preserved after filtering. However, again descending trends are delayed by the width of the filter.

FIG. 5C shows that jitter-like deviations from the large order trend are completely eliminated by minimum delay filtering. In FIG. 5C, the width of the jitter-like deviations are less than the width of minimum delay filter. Note that the magnitude of the deviation can be quite large. It has not effect on the result as long as the effect occurs entirely within the minimum delay filter's window.

The implication of the result illustrated in FIG. 5C is that the width of the minimum delay filter can be dynamically adjust to match (i.e. tune) the amount of expected (or measured) network jitter. Increased jitter leads to increased correlations in the delayed data, which necessitates the use of a minimum delay filter 315 with a greater width.

Figure 6:
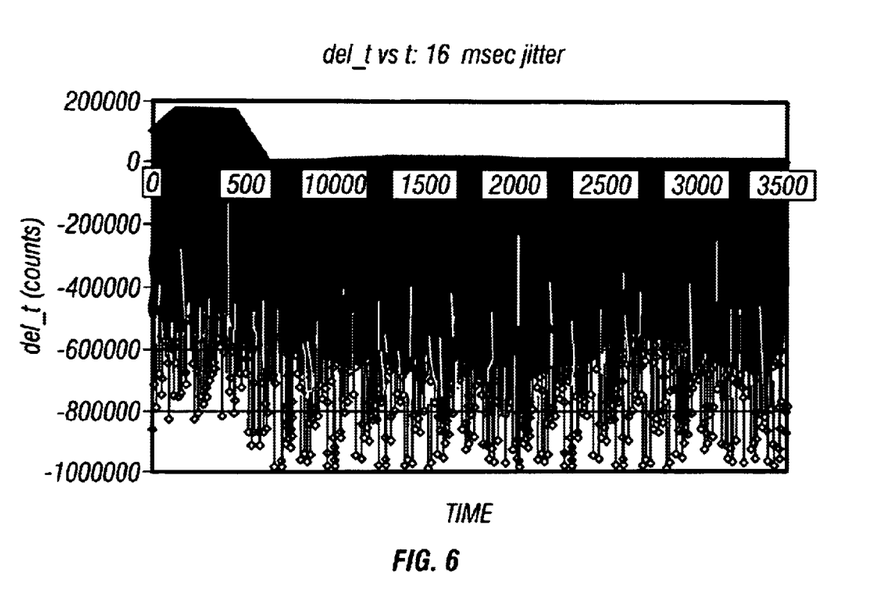
FIG. 6 illustrates actual time synchronization data as received over a network with substantial amounts of jitter prior to minimum delay filtering.
Figure 7:
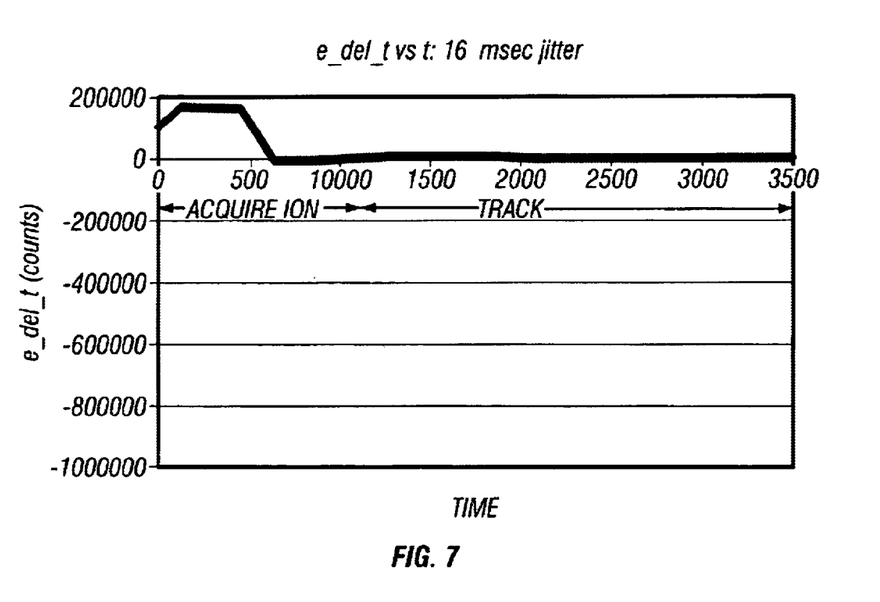
FIG. 7 illustrates the minimum delay filtered results for the sequence of noisy input data of FIG. 6.

Time Synchronization Illustration:

FIG. 6 illustrates actual time synchronization data (transmitted timestamp—received timestamp) as received over a network with substantial amounts of jitter (~16 msec), prior to minimum delay filtering. The y-axis is in terms of the receiving networked gateway's clock count, which corresponds to 16 nsec per count. FIG. 7 shows the minimum delay filtered results for the same sequence of noisy input data.

Figure 8:
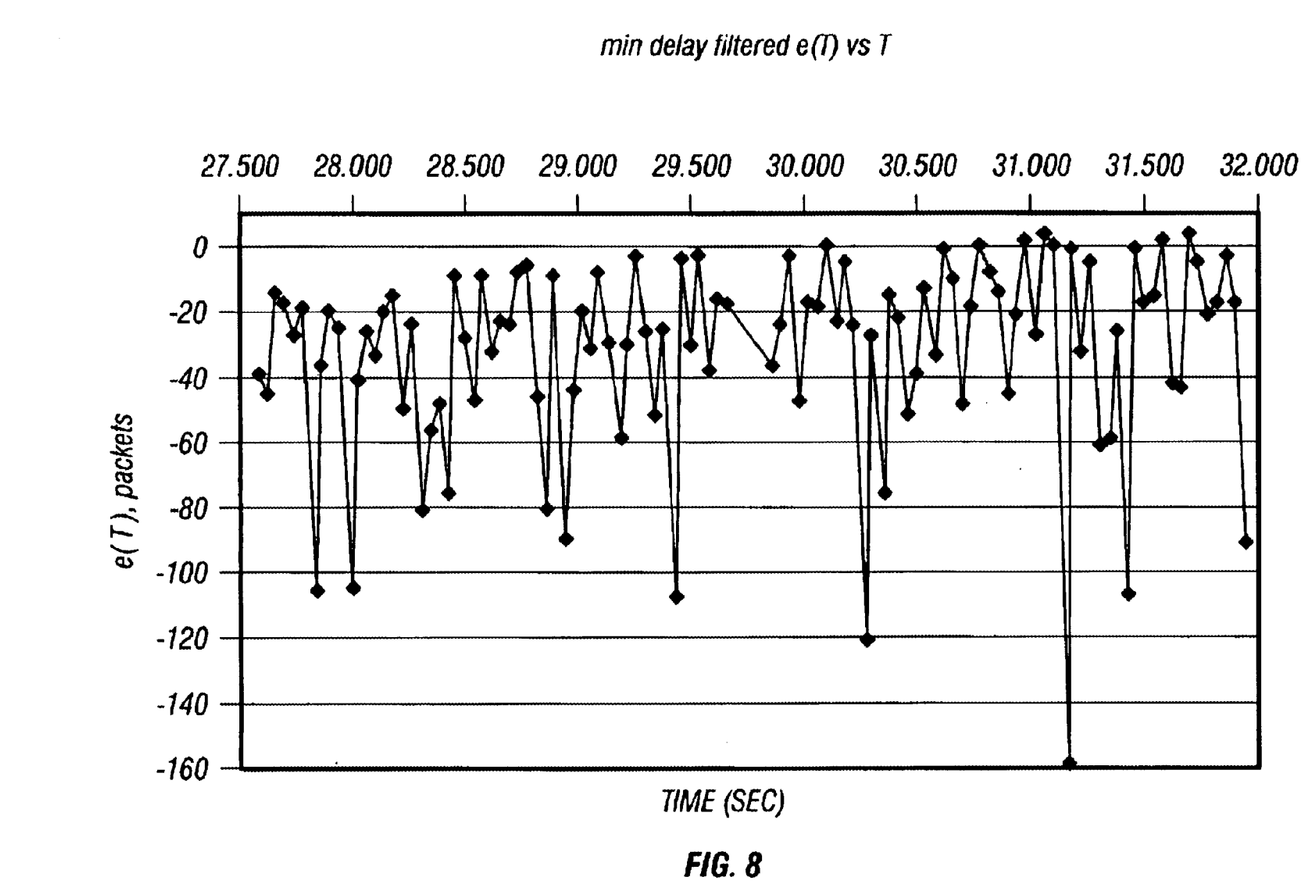
FIG. 8 illustrates FIFO metering data as measured for a network with substantial amounts of jitter.

FIFO Metering Illustration:

FIG. 8 illustrates FIFO metering data, e(T) versus time, as measured for a network with substantial amounts of jitter (~25 msec). The y-axis is in terms of the observed number of data packets in the FIFO, measured at the time shown on the x-axis, minus the target FIFO depth.

Figure 9:
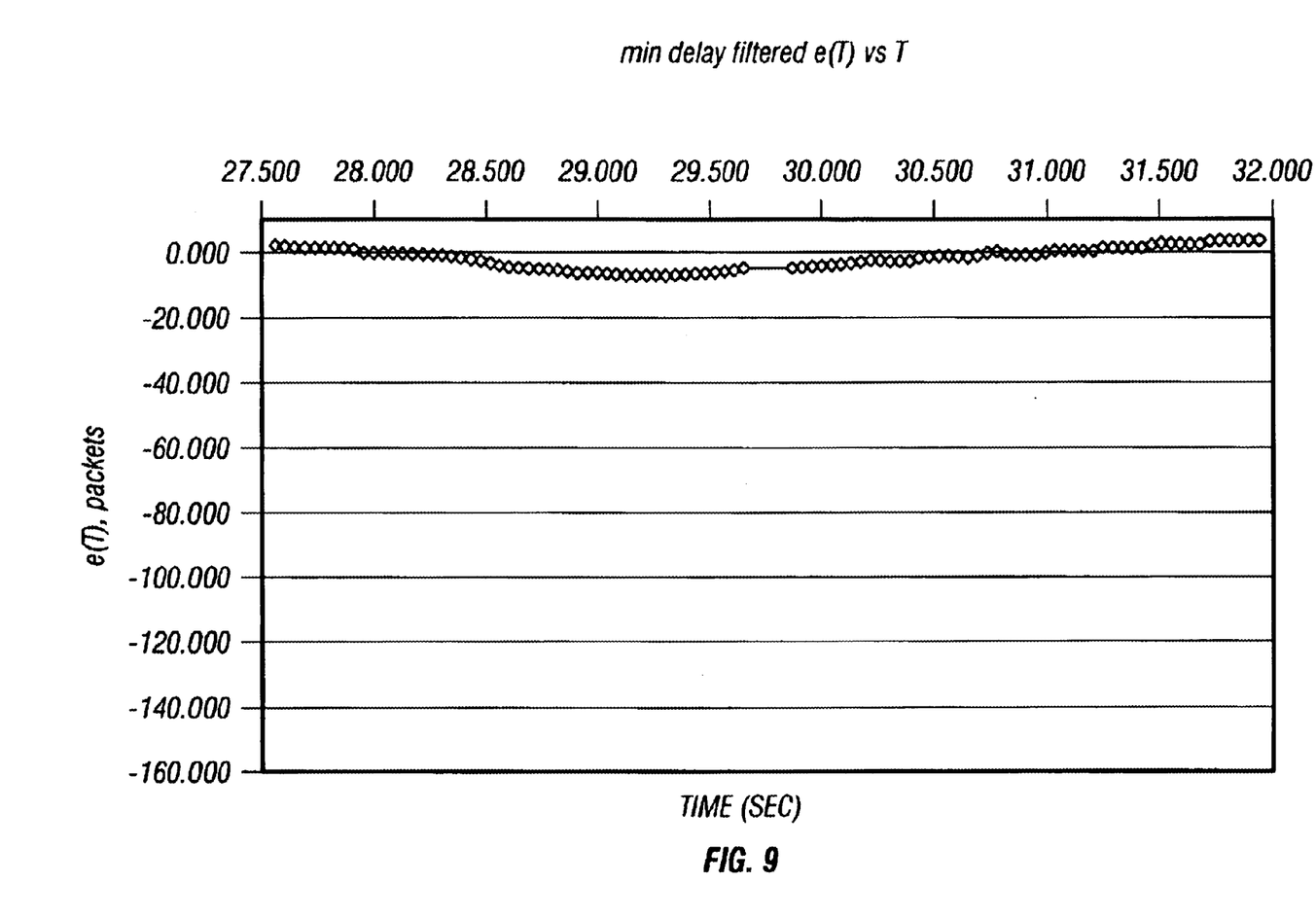
FIG. 9 illustrates the minimum delay filtered results for the sequence of FIG. 8.

FIG. 9 shows the corresponding minimum delay filtered FIFO depth data. The minimum delay filter is seen to be quite effective in removing the effect of network jitter from the error signal e(T).

Numerous variations and modifications of the invention will become readily apparent to those skilled in the art. Accordingly, the invention may be embodied in other specific forms without departing from its spirit or essential characteristics.

What is claimed is:

1. A method of synchronizing network gateways to reduce an effect of jitter, the method comprising:

generating an error signal based on received data;

filtering the error signal with a minimum delay filter to generate a filtered error signal corresponding to a minimum or a maximum of the error signal in a filter window; and generating a digital control signal based on the filtered error signal to reduce the jitter.

2. The method of claim 1, wherein filtering the error signal comprises:

loading a first sample value of the error signal into a register;

sequencing through any remaining samples of the error signal and comparing each sample value with the value stored in the register; and replacing the value in the register with a current sample value if the current sample value is greater.

3. The method of claim 1, further comprising synchronizing the network gateways using time synchronization.

4. The method of claim 3, further comprising using the digital control signal to drive a voltage-controlled crystal oscillator.

5. The method of claim 1, further comprising synchronizing the network gateways using FIFO metering.

6. The method of claim 5, further comprising using the digital control signal to control the output data rate from the FIFO.

7. The method of claim 1, further comprising implementing the minimum delay filter using hardware.

8. The method of claim 5, further comprising implementing the minimum delay filter using software.

9. The method of claim 1, further comprising filtering the filtered error signal with a low pass filter.

10. An apparatus to reduce network jitter, the apparatus comprising:

a minimum delay filter configured to receive an error signal based on received data, the minimum delay filter further configured to generates a filtered error signal corresponding to a minimum or a maximum of the error signal in a filter window; and a controller configured to generate a digital control signal based on the filtered error signal.

11. The apparatus of claim 10, further comprising another filter configured to filters the filtered error signal.

12. The apparatus of claim 10, wherein the minimum delay filter is a hardware filter.

13. The apparatus of claim 10, wherein the minimum delay filter is a software filter.

14. The apparatus of claim 10, wherein the minimum delay filter comprises:

a register;

a multi-tapped delay register configured to hold N samples in a memory; and a comparator configured to successively compare each of the N samples to a value stored in the register, the register value to be replaced with the sample value if the sample value is greater.

15. The apparatus of claim 10, further comprising a time synchronization circuit configured to receive the digital control signal to drive a voltage-controlled crystal oscillator.

16. The apparatus of claim 10, further comprising a FIFO metering circuit configured to receive the digital control signal to control the output data rate from the FIFO.

17. The apparatus of claim 11, wherein the another filter is a low pass filter.

18. The apparatus of claim 11, wherein the another filter is a second minimum delay filter.

19. An article comprising a machine-readable medium storing instructions operable to cause one or more machines to perform operations comprising:

generating an error signal based on received data;

filtering the error signal with a minimum delay filter to generate a filtered error signal, the filtered error signal corresponding to a minimum or a maximum of the error signal in a filter window; and generating a digital control signal based on the filtered error signal to reduce the jitter.

20. The article of claim 19, wherein filtering the error signal comprises:

loading a first sample value of the error signal into a register;

sequencing through any remaining samples of the error signal and comparing each sample value with the value stored in the register; and replacing the value in the register with a current sample value if the current sample value is greater.

21. The article of claim 19, wherein filtering the error signal comprises:

loading a first sample value of the error signal into a register;

sequencing through any remaining samples of the error signal and comparing each sample value with the value stored in the register; and replacing the value in the register with a current sample value if the current sample value is less.

22. The method of claim 1, wherein filtering the error signal comprises:

loading a first sample value of the error signal into a register;

sequencing through any remaining samples of the error signal and comparing each sample value with the value stored in the register; and replacing the value in the register with a current sample value if the current sample value is less.

23. The apparatus of claim 10, wherein the minimum delay filter comprises:

a register;

a multi-tapped delay register configured to hold N samples in a memory; and a comparator configured to successively compare each of the N samples to a value stored in the register, the register value to be replaced with the sample value if the sample value is less.

* * * * *